United States Patent
Free et al.

[19]

[11] Patent Number: 6,136,878
[45] Date of Patent: Oct. 24, 2000

[54] VERY FINE CELL POLYURETHANE FOAMS AND PROCESSES FOR PRODUCING THE SAME

[75] Inventors: Sharon A. Free, Wallingford; David J. Kelly, Chadds Ford; Rocco P. Triolo, Broomall; Robert A. Volz, deceased, late of West Chester, all of Pa., Pauline R. Volz, legal Representative

[73] Assignee: Foamex, L.P., Linwood, Pa.

[21] Appl. No.: 08/802,033

[22] Filed: Feb. 18, 1997

Related U.S. Application Data

[63] Continuation-in-part of application No. 08/191,785, Feb. 3, 1994, abandoned.

[51] Int. Cl.$^7$ ............................. C08G 18/76; C08G 18/48

[52] U.S. Cl. ......................... 521/137; 521/174; 521/176

[58] Field of Search ................................. 521/137, 174, 521/176

[56] References Cited

U.S. PATENT DOCUMENTS

| | | | |
|---|---|---|---|
| 5,124,367 | 6/1992 | Barker et al. | 521/107 |
| 5,436,277 | 7/1995 | Narayan et al. | 521/160 |
| 5,491,176 | 2/1996 | Huygens | 521/159 |
| 5,773,483 | 6/1998 | Eling et al. | 521/125 |

FOREIGN PATENT DOCUMENTS

| | | |
|---|---|---|
| 2136463 | 8/1995 | Canada . |

OTHER PUBLICATIONS

Orbit Abstract of CA 2,136,463 (Aug. 4, 1995).

*Primary Examiner*—Jeffrey C. Mullis
*Attorney, Agent, or Firm*—Connolly Bove Lodge & Hutz, LLP

[57] ABSTRACT

The present invention relates to very fine cell flexible polyurethane foams having at least 87 pores per linear inch (as measured by pressure drop techniques) wherein at least 65% of the isocyanate equivalents of said polyurethane are obtained from MDI. The invention also relates to processes for preparing the very fine cell polyurethane foams.

20 Claims, 1 Drawing Sheet

VERY FINE CELL POLYURETHANE FOAMS AND PROCESSES FOR PRODUCING THE SAME

CROSS-REFERENCE TO RELATED APPLICATION

The present application is a continuation-in-part of U.S. patent application Ser. No. 08/191,785 filed on Feb. 3, 1994, in the names of Sharon A. Free et al, now abandoned.

BACKGROUND OF THE INVENTION

1. Field of the Invention

The present invention relates to very fine cell polyether polyurethane foams and processes for producing the same.

2. Description of the Prior Art

Cellular polymers are prepared by generating a gas during the polymerization of a normally plastic or liquid reaction mixture. The gas causes foaming of the reaction mixture until a polymer sets or gels into a cellular structure known as a foam.

Polyurethane foams are prepared by reacting, in the presence of a blowing agent, polyisocyanates with active hydrogen containing substances such as hydroxyl containing polyesters and polyethers. Catalysts, such as organo-tin compounds and tertiary amines, and foam stabilizing surfactant/emulsifiers, such as silicone oils, are usually incorporated in the reaction mixture to control reaction rate, cell size and porosity. Due to the excellent properties of polyurethane foams, the usage of these foams for various applications has greatly increased over the last twenty to thirty years. For example, flexible polyurethane foam is used widely in comfort cushions (furniture, bedding, automotive); in textile (apparel, blankets); in industrial packaging and in insulation; as well as in household furnishings and the like. The versatility of polyurethane foam results in substantial part from the nature and variety of the starting materials as well as the manner in which the starting materials and the resultant foam are processed. Foams ranging widely in their properties—in density and stiffness, in tensile and tear, in resistance to compression set and fatigue, in flexibility and resilience, in durability and toughness and in hysteresis and char formation when exposed to flame—are obtained by selection and variation of the starting materials and processing conditions.

Many applications require polyurethane foam which is fine celled. For example, cosmetic applicators are made of fine celled polyester polyurethane foams which have a soft tactile feel. Some filter applications require fine cell foam to achieve a required pressure drop. It is known in the industry that the fatigue resistance of polyurethane carpet cushions is improved if the foam is made as fine celled as possible. Current state-of-the-art foams achieve a fine cell structure with about 87 pores (cell faces) per linear inch. A finer cell size is not obtainable using current mechanical techniques.

This invention achieves pore sizes in excess of 87 pores per linear inch by a chemical method. The conventionally used toluene diisocyanate is completely or partially replaced by an isocyanate based on diphenyl methane diisocyanate and polymeric versions thereof. This type of isocyanate also provides the advantage of producing higher load bearing foams with reduced amounts of graft polyols.

SUMMARY OF THE INVENTION

Figure 1:
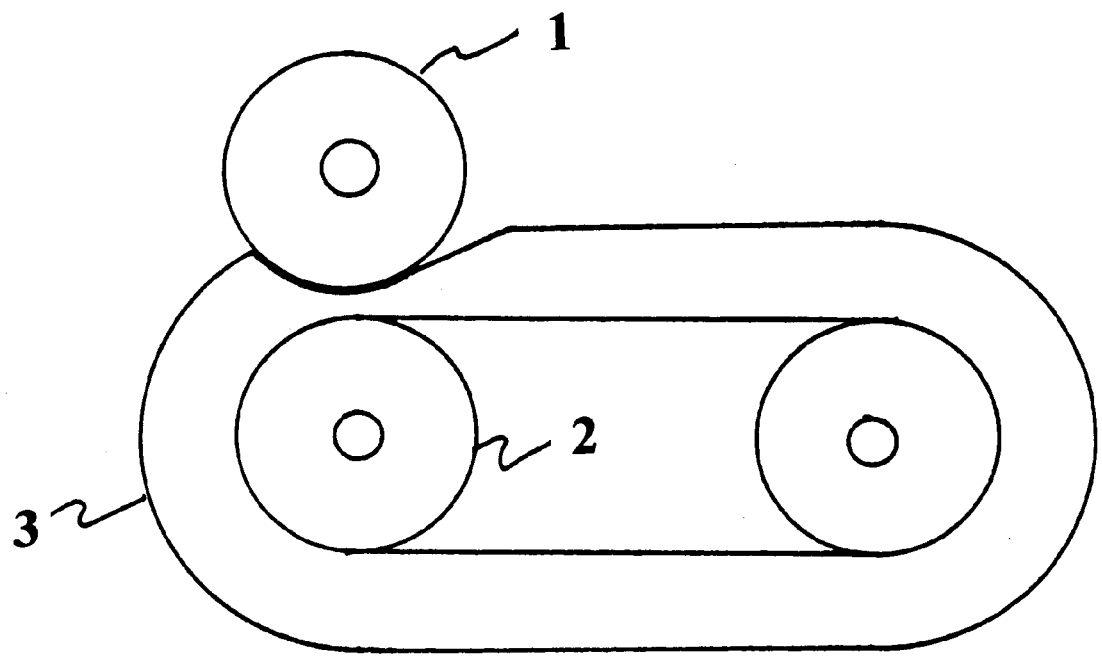
FIG. 1 is a diagram of the apparatus used in the roll shear fatigue test.

The present invention relates to very fine cell polyether polyurethane foams and processes for producing the same. The very fine cell polyether polyurethane foams are produced by using diphenyl methane diisocyanate and polymethylene polyphenyl isocyanate blends (hereinafter sometimes referred to as "MDI" or "polymeric MDI") in combination with polyether polyols and/or graft polyols, wherein the graft polyols are also ether polyols (i.e., none of the polyols used in the present invention are ester polyols). The MDI blends can contain diphenylmethane 4,4' diisocyanate as well as the 2,2' and 2,4' isomers and higher molecular weight oligomers and have an isocyanate functionality of from about 2.1–2.7, preferably from about 2.1–2.5. As used herein, the term "isocyanate functionality" means the molar average number of isocyanate groups per molecule of the blends. When TDI is present in the MDI blends, the amount of TDI (toluene diisocyanate) that is present is less than about 50%, preferably less than about 35% and most preferably less than about 25% (based on isocyanate equivalents in the blend) or less than about 33% by weight, preferably less than about 23% by weight and most preferably less than about 17% by weight. The preferred average molecular weight of the polyether polyols and/or graft polyols is about 3,000–3,500 (i.e., number average molecular weight measured by gel permeation chromatography or "gpc").

The very fine cell polyether polyurethane foams produced with the materials described above preferably have a density of from about 1.5–6.0 lbs/ft$^3$, most preferably from about 2.0–4.3 lbs/ft$^3$, and a cell size that results in greater than 87 pores per linear inch (as determined from pressure drop measurements).

The use of MDI to produce polyether polyurethane foams has opened up a range of opportunities that were not possible heretofore. For example, polyether polyurethane foams with very fine cell sizes (e.g., greater than 87 pores per linear inch) can now be produced. These foams have excellent aesthetics, tactile feel and fatigue properties. Moreover, polyether polyurethane foams with excellent stiffness can be produced with reduced amounts of graft polyol (in comparison to foams produced with TDI), which is one of the more expensive components. For example, in both MDI- and TDI-based foams, as the amount of graft polyol in the polyol mixture is increased the stiffness of the resulting foam (as measured by the Indentation Force Deflection Test and reported as an "IFD" number) is increased. However, in TDI-based foams, the baseline IFD$_{25}$ (i.e., when no graft polyol is used) is about 40 lbs/50 in$^2$ whereas in MDI-based foams the baseline IFD$_{25}$ is about 63 lbs/50 in$^2$. Therefore, the addition of graft polyol at any level in the foam formulation, when combined with MDI as the isocyanate, yields a foam with a much higher IFD$_{25}$ (stiffness) than would be obtained with a TDI-based foam containing the same amount of graft polyol. Moreover, the baseline IFD$_{25}$ for the MDI-based foams is high enough that, for many applications, there is no need to use graft polyols at all.

The "IFD$_{25}$" numbers indicated above are "rest" values. That is, the force needed to compress the foam sample 25% of its initial thickness after being held in that position for one minute.

It is known in the art that the fatigue properties of polyurethane foam improve as the cell size decreases. However, heretofore it has not been possible to obtain polyether polyurethane foams with more than about 87 pores per linear inch (as measured by pressure drop techniques)

with TDI-based foams. The use of MDI has resulted in the attainment of polyether polyurethane foams with greater than 87 pores per linear inch (as measured by pressure drop techniques). This very fine cell size foam demonstrates enhanced fatigue resistance and excellent cushioning and support properties, especially when used as carpet cushioning material.

DESCRIPTION OF THE PREFERRED EMBODIMENTS

The present invention relates to very fine cell flexible polyether polyurethane foams and processes for producing the same. The very fine flexible cell polyether polyurethane foams are produced by using diphenyl methane diisocyanate and polymethylene polyphenyl isocyanate blends (hereinafter sometimes referred to as "MDI" or "polymeric MDI") in combination with polyether polyols and/or graft polyols, wherein the graft polyols are also ether polyols (i.e., none of the polyols used in the present invention are ester polyols). The MDI blends can contain diphenylmethane 4,4' diisocyanate as well as the 2,2' and 2,4' isomers and higher molecular weight oligomers and have an isocyanate functionality of from about 2.1–2.7, preferably from about 2.1–2.5. As used herein, the term "isocyanate functionality" means the molar average number of isocyanate groups per molecule of the blends. When TDI is present in the MDI blends, the amount of TDI (toluene diisocyanate) that is present is less than about 50%, preferably less than about 35% and most preferably less than about 25% (based on isocyanate equivalents in the blend) or less than about 33% by weight, preferably less than about 23% by weight and most preferably less than about 17% by weight. The preferred average molecular weight of the polyether polyols and/or graft polyols is about 3,000–3,500 (i.e., number average molecular weight measured by gel permeation chromatography or "gpc").

Although it is possible to produce foams with lesser amounts (i.e., less than 65%) of the isocyanate equivalents being provided from the MDI, these foams do not demonstrate the desired very fine cell size. Moreover, when the MDI level is in the 11 to 49% range (based on isocyanate equivalents in the blend), the foams tend to collapse.

In a preferred embodiment of the present invention, the flexible polyurethane foam is produced from MDI blends containing diphenyl methane diisocyanate and polymethylene polyphenyl isocyanate in combination with polyether polyols and/or graft polyols, wherein the graft polyols are ether polyols, and further wherein the foam has at least 87 pores per linear inch and at least 65% of the isocyanate equivalents of said polyurethane are obtained from diphenyl methane diisocyanate and polymethylene polyphenyl isocyanate. As discussed earlier, the MDI blends contain TDI and/or isocyanate prepolymer. The amount of the MDI blend that is present during the reaction of the polyols with the MDI blend is in excess of the stoichiometric amount. This means that the isocyanate index should be greater than 100.

In a highly preferred embodiment of the present invention, the isocyanate index of the foam forming mixture is from 101–130. In another highly preferred embodiment of the present invention, the isocyanate index of the foam forming mixture is from 102–120. In the most preferred embodiment of the present invention, the isocyanate index of the foam forming mixture is from about 110 to about 115.

The very fine cell flexible polyether polyurethane foams of the present invention have a density of from about 1.5–6.0 lbs/ft$^3$ and a cell size that results in at least 87 pores per linear inch (as measured by pressure drop techniques). In a preferred embodiment of the present invention, the very fine cell polyether polyurethane foams have at least 90 pores per linear inch (as measured by pressure drop techniques). In the most preferred embodiment of the present invention, the very fine cell polyether polyurethane foams have at least 100 pores per linear inch.

The very fine cell polyether polyurethane foams are flexible foams that are produced at atmospheric pressure. The use of the term "flexible" is meant to indicate that the foams are resilient and will compress without damage to the foam structure when a load is applied to the foam. The flexible foams will also bounce or spring back to their original size and shape after the load is removed, even after several repetitions of applying and removing a load. This is in contrast to rigid or semi-rigid foams that will either not compress without damage to the foam structure when a load is applied to the foam or will not bounce back to their original size and shape after the load has been removed (especially if the load is applied and removed more than once).

The polyether polyols and/or graft polyols used in the process of the present invention are all ether polyols (i.e., no ester polyols are used in the present invention) and have an average molecular weight of about 3,000–3,500 (i.e., number average molecular weight measured by gel permeation chromatography). Examples of these polyols are Voranol 3010 from Dow Chemical (having a reported molecular weight of about 3000±100 which is determined by a formula which corresponds well to number average molecular weight measured by gel permeation chromatography) and Pluracol 1103 from BASF (having a reported molecular weight measured of about 3100 which is determined by a formula which corresponds well to number average molecular weight measured by gel permeation chromatography). The following paragraph provides a more detailed description of these polyols but is not intended to be limiting.

The polyether polyol is polyoxypropylene polyether polyol or mixed poly(oxyethylene/oxypropylene) polyether polyol. Modified polyether polyols are those polyether polyols having a polymer of ethylenically unsaturated monomers dispersed therein. Representative modified polyether polyols include polyoxypropylene polyether polyol into which is dispersed poly(styrene acrylonitrile) or polyurea, and poly(oxyethylene/oxypropylene) polyether polyols into which is dispersed poly(styrene acrylonitrile), or polyurea. Modified polyether polyols are commercially available from several companies, including Arco (supplied as "Polymer Polyol"), BASF (supplied as "Graft Polyol"), Dow (supplied as "Copolymer Polyol") and Mobay (supplied as "PHD Polyol"). Arco, BASF, and Dow disperse poly(styrene acrylonitrile) into the polyol, whereas Mobay disperses polyurea therein. Some examples of commercially available modified polyether polyols are set forth in Table I.

TABLE I

| POLYETHER POLYOL | TYPE |
|---|---|
| Arco | HS100 |
| "Polymer Polyols" | Niax E694 |
| BASF | Pluracol 1103 |
| "Graft Polyols" | Pluracol 994LV |
| Dow | Voranol 3939 |
| "Copolymer Polyols" | Voranol 3943 |
| Mobay | E9232 |
| "PHD Polyols" | |

Modified polyether polyols can be prepared by the procedure described by Critchfield et al, *Rubber Chemistry and Technology*, Vol, 45, No. 5, pp. 1467–1477 (1972) and U.S. Reissue Pat. No. 23,817, which teaches reacting polyether polyol (e.g., polyoxypropylene polyol) with styrene and acrylonitrile in the presence of a free radical catalyst, then isolating the resulting modified polyether. Both references are incorporated herein by reference.

The polyether polyols and/or graft polyols that are used to form the very fine cell flexible polyurethane foams of the present invention are all "ether" polyols. These polyols are not "ester" polyols. Moreover, all of the ether polyols that are used to form the foams of the present invention are conventional polyols that have secondary hydroxyl groups. These polyols are quite different from HR polyols that are terminated with a primary hydroxyl group.

The preferred blowing agent that is employed in the process of the present invention is water in about 1.0 to 3.5 parts by weight (based on 100 parts by weight of the polyol). However, the selection and amount of blowing agent in any particular foam formulation is well within the skill of the polyurethane foam art without undue experimentation.

Conventional polyether polyol catalysts to be used in the process in accordance with the invention include tertiary amines such as triethylamine, tributylamine, N-methylmorpholine, N-ethylmorpholine, N-oxymorpholine, N,N,N',N'-tetramethylethylenediamine, 1,4-diazo-bicyclo-(2,2,2)-octane, N-methyl-N'-dimethylaminoethyl piperazine, N,N-dimethyl benzylamine, bis-(N,N-diethylaminoethyl)adipate, N,N-diethylbenzylamine, pentamethyl diethylenetriamine, N,N-dimethylcyclohexylamine, N,N,N',N'-dimethylphenylethylamine, 1,2-dimethylimidazole, 2-methylimidazole, triethylene diamine, and bis(2-dimethylamino ethyl) ether.

In some embodiments the tertiary amine catalyst contains hydrogen atoms capable of reacting with PMDI (polymethylene polyphenyl isocyanate) and/or any TDI present. Such catalysts include triethanolamine, triisopropanolamine, N-methyldiethanolamine, N-ethyldiethanolamine, N,N-dimethylethanolamine or their reaction products with alkylene oxides, such as propylene oxide, or ethylene oxide, 2,2,4-trimethyl-2-silylmorpholine, 1,3-diethylaminomethyl-tetramethyl-disiloxane or mixtures thereof.

Some embodiments of the invention include organic metal compounds as the catalysts. Preferred organic metal catalysts include organic tin compounds. The organic tin compounds are preferably tin (II) salts of carboxylic acids, such as tin (II)-acetate, tin (II) octanoate, tin (II)-ethylhexanoate, tin (II)-laurate, and the dialkyl tin salts of carboxylic acids, such as dibutyl tin diacetate, dibutyl tin dilaurate, dibutyl tin maleate and dioctyl tin diacetate.

The organic metal catalyst is generally added in amount of from about 0.01 to about 2.0 parts by weight per 100 parts of polyol and preferably from about 0.1 to about 0.50 parts by weight.

Representative surfactant/emulsifiers used in accordance with the invention are polymeric organosilicon compounds which are partially hydrophilic. Such organo silicon surfactant/emulsifiers are described extensively in the literature and sold commercially. The commercially available organo silicon surfactant/emulsifiers are generally sold with instructions as to their suitability for polyether polyol urethane foam production. Typically the commercially available organo silicon surfactant/emulsifiers are polymers which contain a plurality of silicon atoms forming the hydrophobic portion of the polymer and a long chain hydrophilic group, for example, a polyoxyalkylene ether group. The more common organosilicon surfactant/emulsifiers contain a siloxane group. Such compounds are described in detail in U.S. Pat. No. 3,884,848, which description is herein incorporated by reference.

Although foaming of the above-described reaction mixture is effected simply, some embodiments also include supplemental foaming materials. The reaction mixture may additionally contain conventional functional additives, such as fillers, absorbants, antioxidants, enzymes, dyes, fire retardants, pigments, biocides, and the like. Such functional additives are well known in the polyurethane foam art. The additives can either be inert and thus physically held in the foam structure, or chemically reactive, in which case the additive is bound chemically to the polymer comprising the foam.

Commercial production of foam by the process of this invention is achieved by use of conventional slabstock processes operated in the manner currently known to those skilled in the art. Reactants and additives are mixed together and allowed to rise and react freely at atmospheric pressure on a moving casting conveyor in the known manner, and then cured to produce large slabs of a flexible foam having excellent physical properties.

The following (Table II) is a summary of the relationship between the percent of MDI used in the foaming reaction to the cell size of the foam produced by the reaction. The cell size is a function of the number of pores per linear inch with the cell size decreasing as the number of pores per linear inch increases. The data used to prepare Table II was obtained from both hand mixed and machine mixed foams.

TABLE II

| % MDI in equivalents | Cell Size |
| --- | --- |
| 100–65% | >100 ppi |
| 64–50% | about 87 ppi |
| 49–11% | foams collapse, ppi measurement not possible |
| 10–0% | about 87 ppi |

The following examples will aid in explaining, but should not be deemed as limiting, the practice of the present invention. In all cases, unless otherwise noted, all parts and percentages are by weight.

It is understood that the foregoing description is given merely by way of illustration and that many variations may be made therein without departing from the spirit of this invention.

In several of the following examples reference is made to pressure drop measurements. The pressure drop measurements were made by: (1) thermally reticulating the foam disk so that it is completely open (i.e., no cell windows remain); (2) cutting the foam to be tested into a 10 inch diameter disk that was 1 inch thick (plus or minus 0.015 inch); (3) placing the reticulated foam disk into a pressure drop machine which has an eight inch manometer (bottom manometer) and a four inch manometer (top manometer); (4) starting an air blower which forces air through the foam disk and setting the flow of air to read 4.0 inches on the 8 inch manometer (orifice differential); (5) reading the pressure drop from the 4 inch manometer (sample differential) to the nearest 0.005 inch and determining the pores per inch from a pressure drop vs. pore size table produced from empirical data.

Moreover, several of the following examples refer to "roll shear" and/or "hexapod" fatigue tests. Descriptions of these tests are provided below.

The roll shear fatigue test was developed to determine the fatigue resistance of foam carpet cushions under simulated end use compression and shear. A 190 pound person walks on the sample to determine the amount of compression that the foam cushion undergoes under the heel during a normal walking step. The sample (shown as 3 in FIG. 1) is compressed to this amount during the roll shear test by adjusting the gap between the two rolls of the test unit (shown as 1 and 2 in FIG. 1). As an example, if the cushion is compressed 85% by the heel of the 190 pound person, the gap between the rollers is adjusted to be 15% of the thickness of the foam sample being tested (therefore an 85% compression). Other compressions would be obtained analogously. Shear is supplied by rotating the rolls at different rates. The sample belt is sheared and compressed as it is pulled through the rotating rolls. One complete revolution of the sample belt is one cycle. A test is run for 12,000 cycles. Fatigue is measured by determining the percent loss of $IFD_{25}$ and thickness. Initial $IFD_{25}$ and thickness measurements are taken before the start of the test and final $IFD_{25}$ and thickness measurements are taken 24 hours after the completion of 12,000 cycles. It is believed that 12,000 cycles approximates the wear on foam carpet cushion after many years of residential use.

The hexapod fatigue test uses a rotatable drum containing a metal hexapod with six polyurethane studs to measure wear and fatigue. Specifically, one surface of the foam specimen to be tested is attached to the inside surface of the rotatable drum and a carpet sample is attached to the opposite surface of the foam specimen. The metal hexapod rolls randomly on the surface of the carpet inside the rotating drum for a specified number of revolutions (cycles). For a further description of the hexapod apparatus, the reader is referred to ASTM D 5252-92.

Several of the following examples also refer to the compression set at a particular percent. This value is measured by the constant deflection compression set test wherein three carefully measured samples of the foam are placed between metal plates and compressed to 50, 75 or 90% of the sample's original thickness. The samples are held at 158° F. (70° C.) for 22 hours, removed from the apparatus, allowed to recover for 30 minutes (i.e., the foams are allowed to expand from their compressed state for 30 minutes) and then remeasured. For slabstock foam, results are reported as a percentage of original thickness:

$$C_t = (t_0 - t_f/t_0) \times 100\%$$

where $C_t$=compression set as a percent of original thickness, $t_0$=thickness of the original, uncompressed sample, and $t_f$=thickness of the test specimen following a 30-minute recovery after removal from the apparatus.

In the following examples, the foam was produced (i.e., allowed to rise) at normal atmospheric pressure. It is believed that it is important to produce the foams at atmospheric pressure so that the very fine cell size is obtained. Specifically, it is believed that if the foams are produced at a pressure that is significantly below the atmospheric pressure (e.g., 0.90 atm and below), then the cell size will increase (i.e., the foams will have a coarser porosity). Similarly, it is believed that if the foams are produced at superatmospheric pressure (e.g., 1.1 atm and above), then the cell size will decrease (i.e., the foams will have a finer porosity). In addition, producing the foams at either subatmospheric or superatmospheric pressure may detrimentally affect other properties of the final foam.

EXAMPLE 1

A polyol mixture is prepared from 45 parts of a polyether polyol (Voranol 3010-Dow) and 55 parts of a graft polyol (Pluracol 1103-BASF). The polyol mixture (100 total parts) is reacted with 42.6 parts of polymeric MDI (Elastoflex TF2120-BASF), 2 parts water, 0.3 parts tin catalyst (C-9N from Witco Corp.), 0.7 parts amine catalyst 1 (C124—Niax A-1, a proprietary tertiary amine product of Air Products, in dipropylene glycol in a ratio of 1:6), 0.2 parts amine catalyst 2 (Dabco 33LV from Air Products) and 0.8 parts of a silicone surfactant (L620 from OSi). The isocyanate index was 110 (i.e., a 10% excess of isocyanate over the stoichiometric amount).

All of the above ingredients except the isocyanate(s) were combined in a vessel and mixed thoroughly to form a mixture. The isocyanate(s) was then added to the mixture and further mixing was performed to form a final mixture. The final mixture was then poured into a box shaped vessel and allowed to rise into a foam at atmospheric pressure. After the foam had stopped rising, the vessel containing the foam was placed into an oven at 250° F. for one hour to cure. After the one hour curing period, the foam was removed from the vessel as the final foam product.

The foam produced in this example had a density of 4.3 lbs/ft$^3$ and a very fine (i.e., small) cell size. Moreover, the foam was easily processed (i.e, the foam had the expected reactivity, no cleaves or surface cracks were present and the foam did not shrink).

EXAMPLE 2

A polyol mixture is prepared from 45 parts of a polyether polyol (Voranol 3010-Dow) and 55 parts of a graft polyol (Pluracol 1103-BASF). The polyol mixture (100 total parts) is reacted with 36.1 parts of polymeric MDI (Elastoflex TF2120-BASF), 4.2 parts TDI, 2 parts water, 0.2 parts tin catalyst (C-9N from Witco Corp.), 0.5 parts amine catalyst 1 (C124—Niax A-1), 0.2 parts amine catalyst 2 (Dabco 33LV from Air Products) and 1.0 part of a silicone surfactant (L620 from OSi). The isocyanate index was 110 (i.e., a 10% excess of isocyanate over the stoichiometric amount) and the relative amount of MDI to TDI was 85% MDI equivalents to 15% TDI equivalents or 89.6% by weight MDI to 10.4% by weight TDI.

All of the above ingredients except the isocyanate(s) were combined in a vessel and mixed thoroughly to form a mixture. The isocyanate(s) was then added to the mixture and further mixing was performed to form a final mixture. The final mixture was then poured into a box shaped vessel and allowed to rise into a foam at atmospheric pressure. After the foam had stopped rising, the vessel containing the foam was placed into an oven at 250° F. for one hour to cure. After the one hour curing period, the foam was removed from the vessel as the final foam product.

The foam produced in this example had a density of 3.4 lbs/ft$^3$ and a very fine (i.e., small) cell size. Moreover, the foam was easily processed (i.e, the foam had the expected reactivity, no cleaves or surface cracks were present and the foam did not shrink).

EXAMPLE 3

A polyol mixture is prepared from 45 parts of a polyether polyol (Voranol 3010-Dow) and 55 parts of a graft polyol (Pluracol 1103-BASF). The polyol mixture (100 total parts) is reacted with 33.9 parts of polymeric MDI (Elastoflex TF2120-BASF), 5.7 parts TDI, 2 parts water, 0.2 parts tin catalyst (C-9N from Witco Corp.), 1.0 part amine catalyst 1 (C124—Niax A-1), 0.2 parts amine catalyst 2 (Dabco 33LV) and 1.0 part of a silicone surfactant (L620 from OSi). The isocyanate index was 110 (i.e., a 10% excess of isocyanate over the stoichiometric amount) and the relative amount of MDI to TDI was 80% MDI equivalents to 20% TDI equivalents or 85.6% by weight MDI to 14.4% by weight TDI.

All of the above ingredients except the isocyanate(s) were combined in a vessel and mixed thoroughly to form a mixture. The isocyanate(s) was then added to the mixture and further mixing was performed to form a final mixture. The final mixture was then poured into a box shaped vessel and allowed to rise into a foam at atmospheric pressure. After the foam had stopped rising, the vessel containing the foam was placed into an oven at 250° F. for one hour to cure. After the one hour curing period, the foam was removed from the vessel as the final foam product.

The foam produced in this example had a density of 3.7 lbs/ft$^3$ and a very fine cell size.

EXAMPLE 4

A polyol mixture is prepared from 45 parts of a polyether polyol (Voranol 3010-Dow) and 55 parts of a graft polyol (Pluracol 1103-BASF). The polyol mixture (100 total parts) is reacted with 31.8 parts of polymeric MDI (Elastoflex TF2120-BASF), 7.1 parts TDI, 2 parts water, 0.2 parts tin catalyst (C-9N from Witco Corp.), 0.8 parts amine catalyst 1 (C124—Niax A-1), 0.3 parts amine catalyst 2 (Dabco 33LV) and 0.8 parts of a silicone surfactant (L620 from OSi). The isocyanate index was 110 (i.e., a 10% excess of isocyanate over the stoichiometric amount) and the relative amount of MDI to TDI was 75% MDI equivalents to 25% TDI equivalents or 81.8% by weight MDI to 18.2% by weight TDI.

All of the above ingredients except the isocyanate(s) were combined in a vessel and mixed thoroughly to form a mixture. The isocyanate(s) was then added to the mixture and further mixing was performed to form a final mixture. The final mixture was then poured into a box shaped vessel and allowed to rise into a foam at atmospheric pressure. After the foam had stopped rising, the vessel containing the foam was placed into an oven at 250° F. for one hour to cure. After the one hour curing period, the foam was removed from the vessel as the final foam product.

The foam produced in this example had a density of 3.7 lbs/ft$^3$ and a very fine cell size.

EXAMPLE 5

A polyol mixture is prepared from 45 parts of a polyether polyol (Voranol 3010-Dow) and 55 parts of a graft polyol (Pluracol 1103-BASF). The polyol mixture (100 total parts) is reacted with 21.3 parts of polymeric MDI (Elastoflex TF2120-BASF), 14.2 parts TDI, 2 parts water, 0.2 parts tin catalyst (C-9N from Witco Corp.), 0.8 parts amine catalyst 1 (C124—Niax A-1), 0.3 parts amine catalyst 2 (Dabco 33LV) and 2.0 parts of a silicone surfactant (L620 from OSi). The isocyanate index was 110 (i.e., a 10% excess of isocyanate over the stoichiometric amount) and the relative amount of MDI to TDI was 50% MDI equivalents to 50% TDI equivalents or 60% by weight MDI to 40% by weight TDI.

All of the above ingredients except the isocyanate(s) were combined in a vessel and mixed thoroughly to form a mixture. The isocyanate(s) was then added to the mixture and further mixing was performed to form a final mixture. The final mixture was then poured into a box shaped vessel and allowed to rise into a foam at atmospheric pressure. After the foam had stopped rising, the vessel containing the foam was placed into an oven at 250° F. for one hour to cure. After the one hour curing period, the foam was removed from the vessel as the final foam product.

The foam produced in this example had a density of 3.2 lbs/ft$^3$ and a fine cell size. Moreover, the foam was easily processed (i.e, the foam had the expected reactivity, no cleaves or surface cracks were present and the foam did not shrink).

EXAMPLE 6

A polyol mixture is prepared from 45 parts of a polyether polyol (Voranol 3010-Dow) and 55 parts of a graft polyol (Pluracol 1103-BASF). The polyol mixture (100 total parts) is reacted with 4.2 parts of polymeric MDI (Elastoflex TF2120-BASF), 25.5 parts TDI, 2 parts water, 0.1 parts tin catalyst (C-9N from Witco Corp.), 1.0 part amine catalyst 1 (C124—Niax A-1), 0.2 parts amine catalyst 2 (Dabco 33LV) and 1.0 part of a silicone surfactant (L620 from OSi). The isocyanate index was 110 (i.e., a 10% excess of isocyanate over the stoichiometric amount) and the relative amount of MDI to TDI was 10% MDI equivalents to 90% TDI equivalents or 14.1% by weight MDI to 85.9% by weight TDI.

All of the above ingredients except the isocyanate(s) were combined in a vessel and mixed thoroughly to form a mixture. The isocyanate(s) was then added to the mixture and further mixing was performed to form a final mixture. The final mixture was then poured into a box shaped vessel and allowed to rise into a foam at atmospheric pressure. After the foam had stopped rising, the vessel containing the foam was placed into an oven at 250° F. for one hour to cure. After the one hour curing period, the foam was removed from the vessel as the final foam product.

The foam produced in this example had a density of 3.0 lbs/ft$^3$ and a fine cell size. Moreover, the foam was easily processed (i.e, the foam had the expected reactivity, no cleaves or surface cracks were present and the foam did not shrink).

EXAMPLE 7

A polyol mixture is prepared from 50 parts of a polyether polyol (Voranol 3010-Dow) and 50 parts of a graft polyol (Pluracol 1103-BASF). The polyol mixture (100 total parts) is reacted with 42.5 parts of polymeric MDI containing 66% MDI equivalents and 34% TDI equivalents or 76.5% by weight MDI and 23.5% by weight TDI (ISO 236 BASF), 2.1 parts water, 0.3 parts tin catalyst (C-2 from Witco Corp.), 0.3 parts amine catalyst 1 (C124—Niax A-1, a proprietary tertiary amine product of Air Products, in dipropylene glycol in a ratio of 1:6), 0.15 parts amine catalyst 2 (Dabco 33LV from Air Products) and 1.0 part of a silicone surfactant (L620 from OSi). The isocyanate index was 110 (i.e., a 10% excess of isocyanate over the stoichiometric amount).

All of the above ingredients were combined and mixed thoroughly in a machine to form a mixture. The mixture was then discharged from the machine into a box shaped vessel and allowed to rise into a foam at atmospheric pressure. After the foam had stopped rising, the vessel containing the foam was placed into an oven at 250° F. for one hour to cure. After the one hour curing period, the foam was removed from the vessel as the final foam product.

The foam produced in this example had a density of 3.2 lbs/ft$^3$ and a very fine cell size. The pressure drop measurement was >4.2 inches of water (off scale—maximum machine can measure is 4.2 inches of water) which translates to >100 pores per linear inch. Moreover, the foam was easily processed (i.e, the foam had the expected reactivity, no cleaves or surface cracks were present and the foam did not shrink).

EXAMPLE 8

A polyol mixture is prepared from 50 parts of a polyether polyol (Voranol 3010-Dow) and 50 parts of a graft polyol (Pluracol 1103-BASF). The polyol mixture (100 total parts) is reacted with 44.6 parts of polymeric MDI (Elastoflex TF2120 from BASF), 2.1 parts water, 0.3 parts tin catalyst (C-2 from Witco), 0.3 parts amine catalyst 1 (C124—Niax A-1 from Air Products), 0.15 parts amine catalyst 2 (Dabco 33LV from Air Products) and 1.0 part of a silicone surfactant (L6202 a poly(siloxane)/poly(ether) co-polymer from OSi). The isocyanate index was 110 (i.e., a 10% excess of isocyanate over the stoichiometric amount).

All of the above ingredients were combined and mixed thoroughly in a machine to form a mixture. The mixture was then discharged from the machine into a box shaped vessel and allowed to rise into a foam at atmospheric pressure. After the foam had stopped rising, the vessel containing the foam was placed into an oven at 250° F. for one hour to cure. After the one hour curing period, the foam was removed from the vessel as the final foam product.

The foam produced in this example had a density of 3.3 lbs/ft$^3$ and a very fine cell size. The pressure drop measurement was >4.2 inches of water (off scale—maximum machine can measure is 4.2 inches of water) which translates to >100 pores per linear inch. Moreover, the foam was easily processed (i.e, the foam had the expected reactivity, no cleaves or surface cracks were present and the foam did not shrink).

EXAMPLE 9

A polyol mixture is prepared from 50 parts of a polyether polyol (Voranol 3010-Dow) and 50 parts of a graft polyol (Pluracol 1103-BASF). The polyol mixture (100 total parts) is reacted with 37.8 parts of polymeric MDI (Elastoflex TF2120 from BASF), 4.5 parts TDI, 2.1 parts water, 0.1 parts tin catalyst (C-9N from Witco), 0.3 parts amine catalyst 1 (C124—Niax A-1 from Air Products), 0.15 parts amine catalyst 2 (Dabco 33LV from Air Products) and 1.0 part of a silicone surfactant (L6202 from OSI). The isocyanate index was 110 (i.e., a 10% excess of isocyanate over the stoichiometric amount) and the relative amount of MDI to TDI was 85% MDI equivalents to 15% TDI equivalents or 89.4% by weight MDI to 10.6% by weight TDI.

All of the above ingredients were combined and mixed thoroughly in a machine to form a mixture. The mixture was then discharged from the machine into a box shaped vessel and allowed to rise into a foam at atmospheric pressure. After the foam had stopped rising, the vessel containing the foam was placed into an oven at 250° F. for one hour to cure. After the one hour curing period, the foam was removed from the vessel as the final foam product.

The foam produced in this example had a density of 3.0 lbs/ft$^3$ and a very fine cell size. The pressure drop measurement was about 4.1 inches of water which translates to >100 pores per linear inch. Moreover, the foam was easily processed (i.e, the foam had the expected reactivity, no cleaves or surface cracks were present and the foam did not shrink).

EXAMPLE 10

100 parts of a polyether polyol (Voranol 3010-Dow) was reacted with 63.3 parts of polymeric MDI (Elastoflex TF2120 from BASF), 2.9 parts water, 0.1 parts tin catalyst (C-2 from Witco), 0.3 parts amine catalyst 1 (C124 from Air Products), 0.5 parts amine catalyst 2 (Dabco 33LV from Air Products) and 1.0 part of a silicone surfactant (L620 from OSI). The isocyanate index was 115 (i.e., a 15% excess of isocyanate over the stoichiometric amount).

All of the above ingredients were combined and mixed thoroughly in a machine to form a mixture. The mixture was then discharged from the machine into a box shaped vessel and allowed to rise into a foam at atmospheric pressure. After the foam had stopped rising, the vessel containing the foam was placed into an oven at 250° F. for one hour to cure. After the one hour curing period, the foam was removed from the vessel as the final foam product.

The foam produced in this example had a density of 3.1 lbs/ft$^3$ and a very fine cell size. The pressure drop measurement was about 4.2 inches of water which translates to >100 pores per linear inch. Moreover, the foam was easily processed (i.e, the foam had the expected reactivity, no cleaves or surface cracks were present and the foam did not shrink).

EXAMPLE 11

100 parts of a polyether polyol (Voranol 3010-Dow) was reacted with 53.6 parts of polymeric MDI (Elastoflex TF2120 from BASF), 6.4 parts TDI, 2.9 parts water, 0.1 parts tin catalyst (C-2 from Witco), 0.3 parts amine catalyst 1 (C124 from Air Products), 0.5 parts amine catalyst 2 (Dabco 33LV from Air Products) and 1.0 part of a silicone surfactant (L620 from OSi). The isocyanate index was 115 (i.e., a 15% excess of isocyanate over the stoichiometric amount) and the relative amount of MDI to TDI was 85% MDI equivalents to 15% TDI equivalents or 89.3% by weight MDI to 10.7% by weight TDI.

All of the above ingredients were combined and mixed thoroughly in a machine to form a mixture. The mixture was then discharged from the machine into a box shaped vessel and allowed to rise into a foam at atmospheric pressure. After the foam had stopped rising, the vessel containing the foam was placed into an oven at 250° F. for one hour to cure. After the one hour curing period, the foam was removed from the vessel as the final foam product.

The foam produced in this example had a density of 2.8 lbs/ft$^3$ and a very fine cell size. The pressure drop measurement was about 4.2 inches of water which translates to >100 pores per linear inch. Moreover, the foam was easily processed (i.e, the foam had the expected reactivity, no cleaves or surface cracks were present and the foam did not shrink).

EXAMPLE 12

A polyol mixture is prepared from 35 parts of a polyether polyol (Voranol 3010-Dow) and 65 parts of a graft polyol (Pluracol 1103-BASF). The polyol mixture (100 total parts) is reacted with 27.0 parts TDI, 1.8 parts water, 0.1 parts tin catalyst (C-2 from Witco), 0.6 parts amine catalyst 1 (C124 from Air Products), and 0.8 parts of a silicone surfactant (L620 from OSI). The isocyanate index was 115 (i.e., a 15% excess of isocyanate over the stoichiometric amount).

All of the above ingredients were combined and mixed thoroughly in a machine to form a mixture. The mixture was then discharged from the machine onto a moving casting conveyor and allowed to rise and cure into the final foam product at ambient temperature and atmospheric pressure (i.e., 1 atm).

The foam produced in this example had a density of 3.0 lbs/ft$^3$ and a fine cell size. The pressure drop measurement was 2.34 inches of water which translates to about 87 pores per linear inch. Moreover, the foam was easily processed (i.e, the foam had the expected reactivity, no cleaves or surface cracks were present and the foam did not shrink).

EXAMPLE 13

100 parts of a polyether polyol (Voranol 3010-Dow) was reacted with 58.83 parts of polymeric MDI containing 66%

MDI equivalents and 34% TDI equivalents or 76.5% by weight MDI and 23.5% by weight TDI (ISO 236 BASF), 2.8 parts water, 0.08 parts tin catalyst (C-2 from Witco Corp.), 0.28 parts amine catalyst 1 (C124 from Air Products), 0.50 parts amine catalyst 2 (Dabco 33LV from Air Products) and 1.2 parts of a silicone surfactant (L620 from OSi). The isocyanate index was 115 (i.e., a 15% excess of isocyanate over the stoichiometric amount).

All of the above ingredients were combined and mixed thoroughly in a machine to form a mixture. The mixture was then discharged from the machine onto a moving casting conveyor and allowed to rise and cure into the final foam product at ambient temperature and atmospheric pressure (i.e., 1 atm).

The foam produced in this example had a density of 2.0 lbs/ft$^3$ an IFD$_{25}$ (15 inches by 15 inches by 4 inches) of 63, a tensile strength of 17.0 psi, an elongation of 103%, a tear strength of 1.3 ppi (pounds per linear inch), a compression set (50%) of 36.2%, a compression set (90%) of 88.4% and a very fine cell size. Moreover, the foam was easily processed (i.e, the foam had the expected reactivity, no cleaves or surface cracks were present and the foam did not shrink).

Roll shear (12,000 cycles) fatigue tests on the foam resulted in a 32.7% IFD$_{25}$ loss (foam compressed 92% during test to simulate 190 pound person walking on the foam).

Hexapod (30,000 cycles) fatigue tests resulted in a 25.7% IFD$_{25}$ loss and a 1.1% thickness loss. In addition, the foam received a carpet wear rating of 3–4 where 5=no wear and 1=severe wear.

EXAMPLE 14

A polyol mixture is prepared from 45 parts of a polyether polyol (Voranol 3010-Dow) and 55 parts of a graft polyol (Pluracol 1103-BASF). The polyol mixture (100 total parts) was reacted with 40.48 parts of polymeric MDI containing 66% MDI equivalents and 34% TDI equivalents or 76.5% by weight MDI and 23.5% by weight TDI (ISO 236 BASF), 2.0 parts water, 0.20 parts tin catalyst (C-2 from Witco Corp.), 0.30 parts amine catalyst 1 (C124 from Air Products), 0.15 parts amine catalyst 2 (Dabco 33LV) and 1.0 part of a silicone surfactant (L620 from OSi). The isocyanate index was 110 (i.e., a 10% excess of isocyanate over the stoichiometric amount).

All of the above ingredients were combined and mixed thoroughly in a machine to form a mixture. The mixture was then discharged from the machine onto a moving casting conveyor and allowed to rise and cure into the final foam product at ambient temperature and atmospheric pressure (i.e., 1 atm).

The foam produced in this example had a density of 3.0 lbs/ft$^3$ an IFD$_{25}$ (15 inches by 15 inches by 4 inches) of 93, a tensile strength of 34.4 psi, an elongation of 114%, a tear strength of 2.6 ppi, a compression set (50%) of 3.7%, a compression set (90%) of 8.6% and a very fine cell size. Moreover, the foam was easily processed (i.e, the foam had the expected reactivity, no cleaves or surface cracks were present and the foam did not shrink).

Roll shear (12,000 cycles) fatigue tests on the foam resulted in a 20.0% IFD$_{25}$ loss (foam compressed 85% during test to simulate 190 pound person walking on the foam).

Hexapod (30,000 cycles) fatigue tests resulted in a 18.2% IFD$_{25}$ loss and a 1.1% thickness loss. In addition, the foam received a carpet wear rating of 3–4 where 5=no wear and 1=severe wear.

EXAMPLE 15

A polyol mixture is prepared from 40 parts of a polyether polyol (Voranol 3010-Dow) and 60 parts of a graft polyol (Pluracol 1103-BASF). The polyol mixture (100 total parts) was reacted with 40.15 parts of polymeric MDI containing 66% MDI equivalents and 34% TDI equivalents or 76.5% by weight MDI and 23.5% by weight TDI (ISO 236 BASF), 2.0 parts water, 0.20 parts tin catalyst (C-2 from Witco Corp.), 0.38 parts amine catalyst 1 (C124 from Air Products), 0.15 parts amine catalyst 2 (Dabco 33LV) and 1.0 part of a silicone surfactant (L620 from OSi). The isocyanate index was 110 (i.e., a 10% excess of isocyanate over the stoichiometric amount).

All of the above ingredients were combined and mixed thoroughly in a machine to form a mixture. The mixture was then discharged from the machine onto a moving casting conveyor and allowed to rise and cure into the final foam product at ambient temperature and pressure (i.e., 1 atm).

The foam produced in this example had a density of 3.3 lbs/ft$^3$, an IFD$_{25}$ (15 inches by 15 inches by 4 inches) of 132, a tensile strength of 38 psi, an elongation of 111%, a tear strength of 1.8 ppi (pounds per linear inch), a compression set (90%) of 11% and a very fine cell size. Moreover, the foam was easily processed (i.e, the foam had the expected reactivity, no cleaves or surface cracks were present and the foam did not shrink).

EXAMPLE 16

Comparison

A polyol mixture is prepared from 35 parts of a polyether polyol (Voranol 3010-Dow) and 65 parts of a graft polyol (Pluracol 1103-BASF). The polyol mixture (100 total parts) was reacted with 27 parts by weight TDI, 1.8 parts water, 0.10 parts tin catalyst (C-2 from Witco Corp.), 0.60 parts amine catalyst 1 (C124 from Air Products), and 0.8 parts of a silicone surfactant (L620 from OSi). The isocyanate index was 115 (i.e., a 15% excess of isocyanate over the stoichiometric amount).

All of the above ingredients were combined and mixed thoroughly in a machine to form a mixture. The mixture was then discharged from the machine onto a moving casting conveyor and allowed to rise and cure into the final foam product at ambient temperature and pressure (i.e., 1 atm).

The foam produced in this example had a density of 3.0 lbs/ft$^3$, an IFD$_{25}$ (15 inches by 15 inches by 4 inches) of 100, a tensile strength of 29.8 psi, an elongation of 142%, a tear strength of 2.4 ppi, a compression set (90%) of 5.8% and a fine cell size (about 87 ppi). Moreover, the foam was easily processed (i.e, the foam had the expected reactivity, no cleaves or surface cracks were present and the foam did not shrink).

Roll shear (12,000 cycles) fatigue tests on the foam resulted in a 28.3% IFD$_{25}$ loss and a 0.2% thickness loss (foam compressed 85% during test to simulate 190 pound person walking on the foam).

Hexapod (30,000 cycles) fatigue tests resulted in a 19% IFD$_{25}$ loss and a 0.5% thickness loss. In addition, the foam received a carpet wear rating of 3–4 where 5=no wear and 1=severe wear.

Comparison of Examples 14 and 16 shows that the MDI-based foam has a higher tensile strength and better fatigue properties (lower % IFD loss in the roll shear test) than the TDI-based foam.

What is claimed is:

1. A flexible polyurethane foam produced at ambient pressure from a reaction between an MDI blend containing diphenyl methane diisocyanate and polymethylene polyphenyl isocyanate and polyether polyols and/or graft polyols having a number average molecular weight of from about 3,000 to 3,500, wherein: (a) the amount of said MDI blend present during said reaction is in excess of the stoichiometric amount up to about 15% in excess of the stoichiometric amount; (b) said foam has greater than 87 pores per linear inch; and (c) at least 65% of the isocyanate equivalents of said polyurethane are obtained from diphenyl methane diisocyanate and polymethylene polyphenyl isocyanate.

2. A polyurethane foam according to claim 1, wherein said foam has a density of at least 1.5 lbs/ft$^3$.

3. A polyurethane foam according to claim 1, wherein said foam has at least 100 pores per linear inch.

4. A polyurethane foam according to claim 1, wherein at least 75% of the isocyanate equivalents of said polyurethane are obtained from diphenyl methane diisocyanate and polymethylene polyphenyl isocyanate.

5. A polyurethane foam according to claim 1, wherein at least 80% of the isocyanate equivalents of said polyurethane are obtained from diphenyl methane diisocyanate and polymethylene polyphenyl isocyanate.

6. A polyurethane foam according to claim 1, wherein at least 85% of the isocyanate equivalents of said polyurethane are obtained from diphenyl methane diisocyanate and polymethylene polyphenyl isocyanate.

7. A polyurethane foam according to claim 1, wherein at least 90% of the isocyanate equivalents of said polyurethane are obtained from diphenyl methane diisocyanate and polymethylene polyphenyl isocyanate.

8. A polyurethane foam according to claim 1, wherein at least 95% of the isocyanate equivalents of said polyurethane are obtained from diphenyl methane diisocyanate and polymethylene polyphenyl isocyanate.

9. A carpet cushion consisting essentially of the polyurethane foam of claim 1.

10. A polyurethane foam according to claim 1, wherein the MDI blend contains diphenyl methane diisocyanate, polymethylene polyphenyl isocyanate and toluene diisocyanate.

11. A process for the production of a flexible polyurethane foam which has greater than 87 pores per linear inch and further wherein at least 65% of the isocyanate equivalents of said polyurethane are obtained from diphenyl methane diisocyanate and polymethylene polyphenyl isocyanate, wherein said process comprises reacting at least one polyol selected from the group consisting of an ether polyol and a graft polyol having a number average molecular weight of from about 3,000 to 3,500 with an MDI blend containing at least one isocyanate selected from the group consisting of diphenylmethane 4,4' diisocyanate, diphenylmethane 2,2' diisocyanate and diphenylmethane 2,4' diisocyanate, said reaction occurring at ambient pressure and further wherein the amount of said MDI blend present during said reaction is in excess of the stoichiometric amount up to about 15% in excess of the stoichiometric amount.

12. A process for the production of the flexible polyurethane foam as claimed in claim 11, wherein the MDI blend consists essentially of at least 70% by equivalents of a polymeric isocyanate containing at least one isocyanate selected from the group consisting of diphenylmethane 4,4' diisocyanate, diphenylmethane 2,2' diisocyanate and diphenylmethane 2,4' diisocyanate and the remainder of said MDI blend being toluene diisocyanate and isocyanate prepolymer.

13. A process as claimed in claim 12, wherein said at least one polyol consists essentially of ether polyols.

14. A process according to claim 12, wherein the amount of said MDI blend present during said reaction is from about 10% to 15% in excess of the stoichiometric amount.

15. A process according to claim 12, wherein said isocyanate blend consists essentially of at least 75% by equivalents of said polymeric isocyanate.

16. A process according to claim 15, wherein said isocyanate blend consists essentially of at least 80% by equivalents of said polymeric isocyanate.

17. A process according to claim 16, wherein said isocyanate blend consists essentially of at least 85% by equivalents of said polymeric isocyanate.

18. A process according to claim 17, wherein said isocyanate blend consists essentially of at least 90% by equivalents of said polymeric isocyanate.

19. A process according to claim 11, wherein the amount of said MDI blend present during said reaction is from about 10% to 15% in excess of the stoichiometric amount.

20. A flexible polyurethane foam produced at ambient pressure from a reaction between:

a) an MDI blend consisting essentially of diphenyl methane diisocyanate, polymethylene polyphenyl isocyanate and toluene diisocyanate; and b) polyether polyols, graft polyols or mixtures of the two, said polyols having a number average molecular weight of from about 3,000 to 3,500;

wherein: (i) the amount of said MDI blend present during said reaction is in excess of the stoichiometric amount up to about 15% in excess of the stoichiometric amount; (ii) said foam has greater than 87 pores per linear inch; and (iii) at least 65% of the isocyanate equivalents of said polyurethane are obtained from diphenyl methane diisocyanate and polymethylene polyphenyl isocyanate.

* * * * *